United States Patent [19]

Mielenz

[11] Patent Number: 4,583,849
[45] Date of Patent: Apr. 22, 1986

[54] METHOD AND APPARATUS FOR EXPOSING COLOR CORRECTION MASKS AND COLOR SEPARATION NEGATIVES

[76] Inventor: William R. Mielenz, 1136 Hazel Ave., Deerfield, Ill. 60015

[21] Appl. No.: 632,019

[22] Filed: Jul. 18, 1984

[51] Int. Cl.⁴ .............................................. G03B 27/04
[52] U.S. Cl. ....................................... 355/88; 355/95; 355/102
[58] Field of Search ....................... 355/32, 35, 86, 88, 355/95, 102

[56] References Cited

U.S. PATENT DOCUMENTS 3,801,198 4/1974 David .................................... 355/32
4,110,036 8/1978 Guillaume ............................. 355/32

OTHER PUBLICATIONS

Kodak, "Kodak Photographic Materials for the Graphic Arts, Films, Glass Plates, Papers", published 1967.
Kodak, "Color Separation and Color Masking a Kodak Color Data Book", published 1951, 56 page book.
Kodak, "Masking Color Transparencies for Photomechanical Reproduction", published 1960, 59 page book.
Berkey Technical, "Berkey Graphic Master", 12 page brochure.
R. W. Borrowdale Co., "Borrowdale", 2 page brochure.
DuPont, "The Contact Screen Story", 97 page book.
Miles Southworth, "Developments Promise Big Cuts in Photo Separation Costs", Oct. 1978, 1 page article.
Zelacolor, "The Zelacolor System General Description", 2 page brochure.
Zelacolor, "The Zelacolor System, A New Era in Reproduction General Description", 4 page brochure.

Primary Examiner—Richard A. Wintercorn
Attorney, Agent, or Firm—Welsh & Katz, Ltd.

[57] ABSTRACT

Methods and apparatus are provided for producing a set of color correction masks on a single piece of masking film, or a set of color separation negatives on a single piece of separation negative film. The set of masks or set of negatives may be exposed so that each entire set may be developed simultaneously under identical development conditions. This is accomplished by determining a development time which provides substantially identical or other desired contrast indices for all of the masks or negatives in a set. The exposure time required for each mask or negative in the set is then determined so that the color components of the exposures will be balanced in the manner desired when the exposures are developed for the predetermined development time. The exposures may then be made in the apparatus provided for that purpose.

The apparatus of the invention includes means for rotating a slide transparency and an opaque shield to expose four quadrants of a single piece of film in sequence. The slide is preferably maintained in contact with the film during each exposure.

The color correction masks are normally made first, and are used in the process of making the separation negatives. Means are provided in the apparatus for maintaining the correction masks in proper registration with the slide transparency so that properly filtered light to which the negatives are exposed passes through an appropriate mask before it passes through the slide transparency to the negative film.

The entire exposure process and apparatus may be automatically controlled, if desired, so that an entire set of masks or negatives may be made in sequence without interruptions or adjustments.

27 Claims, 10 Drawing Figures

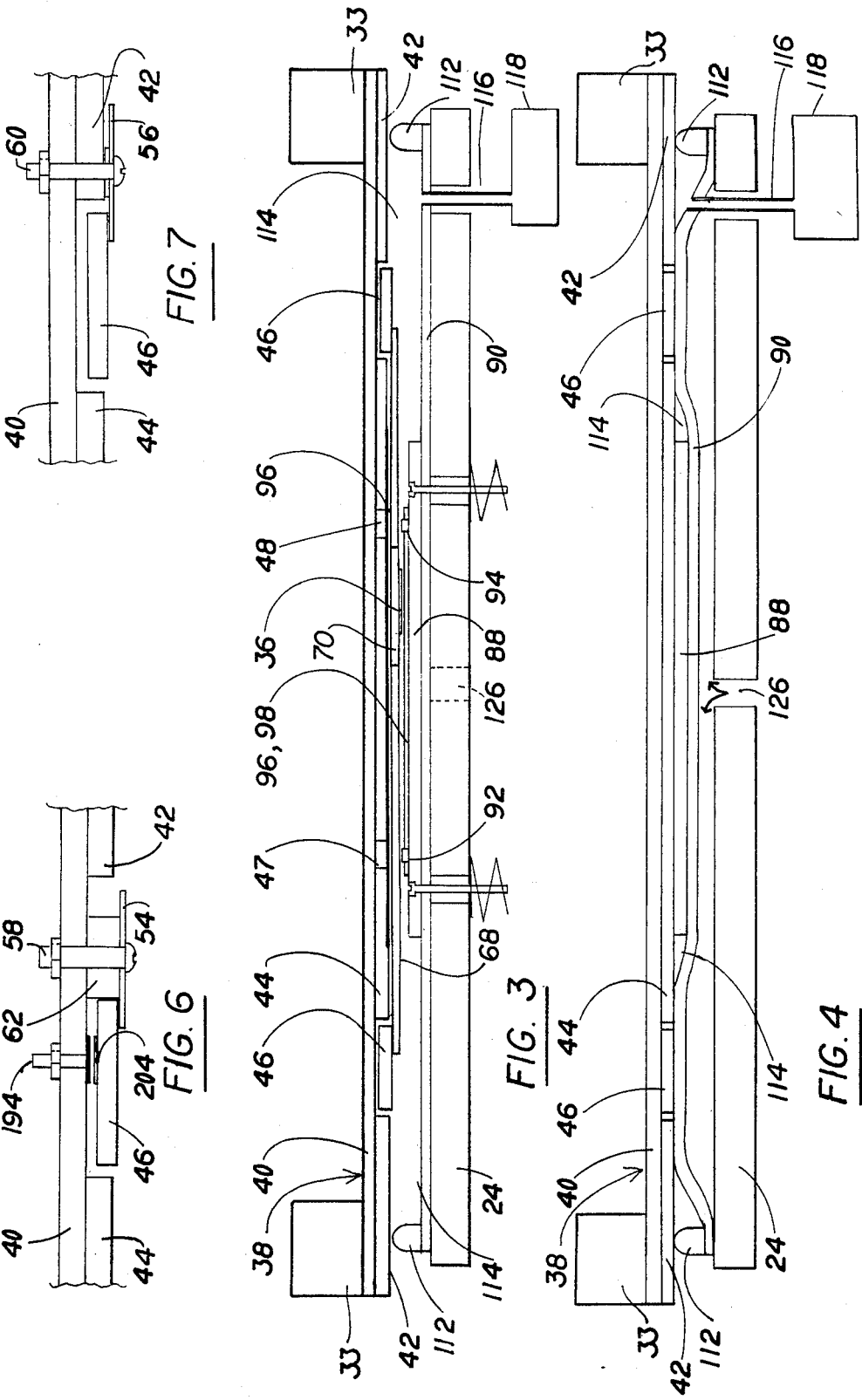

METHOD AND APPARATUS FOR EXPOSING COLOR CORRECTION MASKS AND COLOR SEPARATION NEGATIVES

BACKGROUND OF THE INVENTION

This invention relates to the field of color photoengraving, and more particularly to the exposure of color correction masks and color separation negatives used for color printing.

Printing plates used in photoengraving can only print one color of ink at a time on a piece of paper stock. In order to print a color photograph from a color transparency such as a color slide, the paper stock must be printed in succession with three or more different plates, each having a different colored ink. In four-color photoengraving, which is in wide use, the inks are usually yellow, cyan, magenta and black.

In order to manufacture the printing plates, the components of the primary colors in the transparency are separated and recorded on separate pieces of film known as color separation negatives. The separation negatives are made by exposing specially adapted film to properly filtered light passed through the transparency. The light may also be passed through a properly registered color correction mask, which will be described.

In four color photoengraving, red, green and blue filters are used to separate the components of the primary colors and record them on three separation negatives. Another filter is used to add depth and shape to the photographed image by recording particularly dark portions of the picture on a fourth negative.

The plates are engraved so that when the paper stock is printed with all of the plates properly registered, the inks combine to recreate the original color scheme as accurately as possible, or as accurately as desired. In four-color photoengraving, each primary color is printed in its corresponding substractive color. Thus, cyan ink prints the red-filter record, magenta ink prints the green-filter record, yellow ink prints the blue-filter record, and black ink prints the dark areas of the picture.

Commercially available inks do not print colors precisely. For example, cyan ink behaves as if it were contaminated with some yellow and magenta ink, and absorbs some blue and green light. For this reason, color correction masks are made which compensate for undesired properties of the inks.

The color correction masks are made in much the same manner as the separation negatives, by exposing a piece of specially adapted film to light through a color transparency and an appropriate color filter. One such film is Kodak Pan Masking Film.

The exposure of the masks is difficult and time-consuming because each mask is mounted for exposure one at a time, and they must be exposed in an otherwise totally dark room, without the benefit of dark room lamps. As a result, lights must be turned on and off constantly throughout the process to change the filters as the masks are exposed and to adjust the equipment for the various exposures, or all of these activities must be performed by the operator in total darkness.

Each of the exposed masks is developed by bathing it in proper chemicals for predetermined time periods. Data published by Kodak indicate that under certain circumstances the development time for Kodak Pan Masking Film, for example, may be the same for each mask. However, Kodak recommends that the development times for the masks be adjusted to achieve desired contrasts, and in practice the time that each mask is developed varies, so separate pieces of film are used for the various masks so that they may be developed individually. Thus, in the four-color process, four pieces of film are needed to make the masks, if four masks are used.

The mask developing process is also difficult and time-consuming because the four masks must be developed one at a time and the chemical compositions and temperatures of the chemical baths must be carefully controlled during the entire process. The development process is further complicated by the common practice of obtaining desired contrast indices by adjusting the development times of the masks.

A popular film for color separation negatives made from transparencies is Kodak Separation Negative Film Type I. Data published by Kodak indicate that the development times required to achieve certain contrast indices using that film is different for the four negatives. For this reason, the separation negatives are generally developed one at a time.

Exposure of four negatives for development one at a time is time-consuming and difficult because four exposure set-ups and adjustments must be made, and the exposures must be made in total darkness. Development is also difficult and time-consuming because the development process must be performed four times, and chemical temperatures, chemical compositions and the like must be maintained within strict parameters during the entire time.

In order to develop the four negatives for different periods of time, they must be exposed on separate pieces of film. So in addition to the four pieces of film required for the correction masks, if there are four masks, four more pieces of film are needed for the separation negatives.

The known methods of making color correction masks and color separation negatives just described require the use of as many as eight pieces of film, because each mask and each negative must be exposed and developed individually. This is inefficient and relatively expensive, in part because each piece of film must have enough excess film around its edges to allow for registration holes and adequate borders. Thus, there is a need for methods and apparatus for making color correction masks and separation negatives which use film more efficiently and less expensively.

Exposing and developing masks and negatives one at a time is difficult and time-consuming, as has been described. Thus, there is also a need for processes and apparatus for making color correction masks and color separation negatives which are less time-consuming and less difficult than known processes and apparatus.

Accordingly, an object of this invention is to provide new and improved methods and apparatus for exposing a plurality of color correction masks on a single piece of film so that film is used more efficiently.

Another object of this invention is to provide new and improved methods and apparatus for exposing a plurality of color correction masks on a single piece of film so that the masks may be developed simultaneously under the same conditions.

Still another object is to provide new and improved methods and apparatus for exposing a plurality of color separation negatives on a single piece of film so that film is used more efficiently.

Yet another object is to provide new and improved methods and apparatus for exposing a plurality of color separation negatives on a single piece of film so that the separation negatives may be developed simultaneously under the same conditions.

A still further object is to provide new and improved methods and apparatus for presetting the exposure time for a plurality of color correction masks and exposing the masks automatically, without further adjustments or interruptions.

Yet another object is to provide new and improved methods and apparatus for presetting the exposure time for a plurality of color separation negatives and exposing the negatives automatically, without further adjustments or interruptions.

SUMMARY OF THE INVENTION

In keeping with one aspect of this invention, a method and apparatus are provided for producing a set of color correction masks on a single piece of masking film, or a set of color separation negatives on a single piece of separation negative film. The set of masks or set of negatives can be exposed so that an entire set may be developed simultaneously under identical development conditions. This is accomplished by determining a development time which provides substantially identical or other desired contrast indices for all of the masks or negatives in a set. The exposure time required for each mask or negative in the set is then determined so that the color content of the exposures will be balanced in the manner desired when the exposures are developed for the predetermined development time. The exposures may then be made in the apparatus provided for that purpose.

The apparatus includes light source means for providing filtered light of selected wavelengths so that substantially only preselected colors are emitted. Filter means such as a filter wheel or the like are provided with the light source means for changing the selected wavelengths and selected colors as desired. Slide holding means support at least one color transparency a predetermined distance from the light source means, and means are provided for maintaining a first quadrant of a piece of masking film or separation negative film in contact with, or a predetermined distance from the transparency for exposure of the first quadrant to filtered light through the transparency. When the first quadrant is exposed to the filtered light for the proper time, the remaining quadrants of the film are optically isolated from the light.

After exposure of the first quadrant, the filter means are changed so that a different color of light is emitted, and the transparency is located in contact with, or a predetermined distance from a second quadrant of the film for exposure of the second quadrant to the filtered light through the transparency. The other remaining quadrants of the film are prevented from being exposed to the light when the second quadrant is exposed. The remaining exposures in the set are made in the same manner.

The color correction masks are normally made first, and are used in the process of making the separation negatives. Means are provided in the apparatus for maintaining the correction masks in proper registration with the transparency so that the filtered light passes through an appropriate mask before it passes through the transparency to the negative film.

The entire exposure process and apparatus can be automatically controlled, if desired, so that an entire set of masks or negatives may be made in sequence, without interruptions or adjustments.

BRIEF DESCRIPTION OF THE DRAWINGS

The above-mentioned and other objects of this invention and the manner of obtaining them will become more apparent, and the invention itself will be best understood by reference to the following description of the invention taken in conjunction with the accompanying drawings in which:

FIG. 3 is a sectional view taken along lines 3—3 in FIG. 2;

FIG. 4 is another sectional view taken along lines 4—4 in FIG. 2;

FIG. 6 is a detail view of a portion of the apparatus shown in FIG. 3;

FIG. 7 is a detail view of another portion of the apparatus shown in FIG. 3;

DETAILED DESCRIPTION OF THE INVENTION

Figure 1:
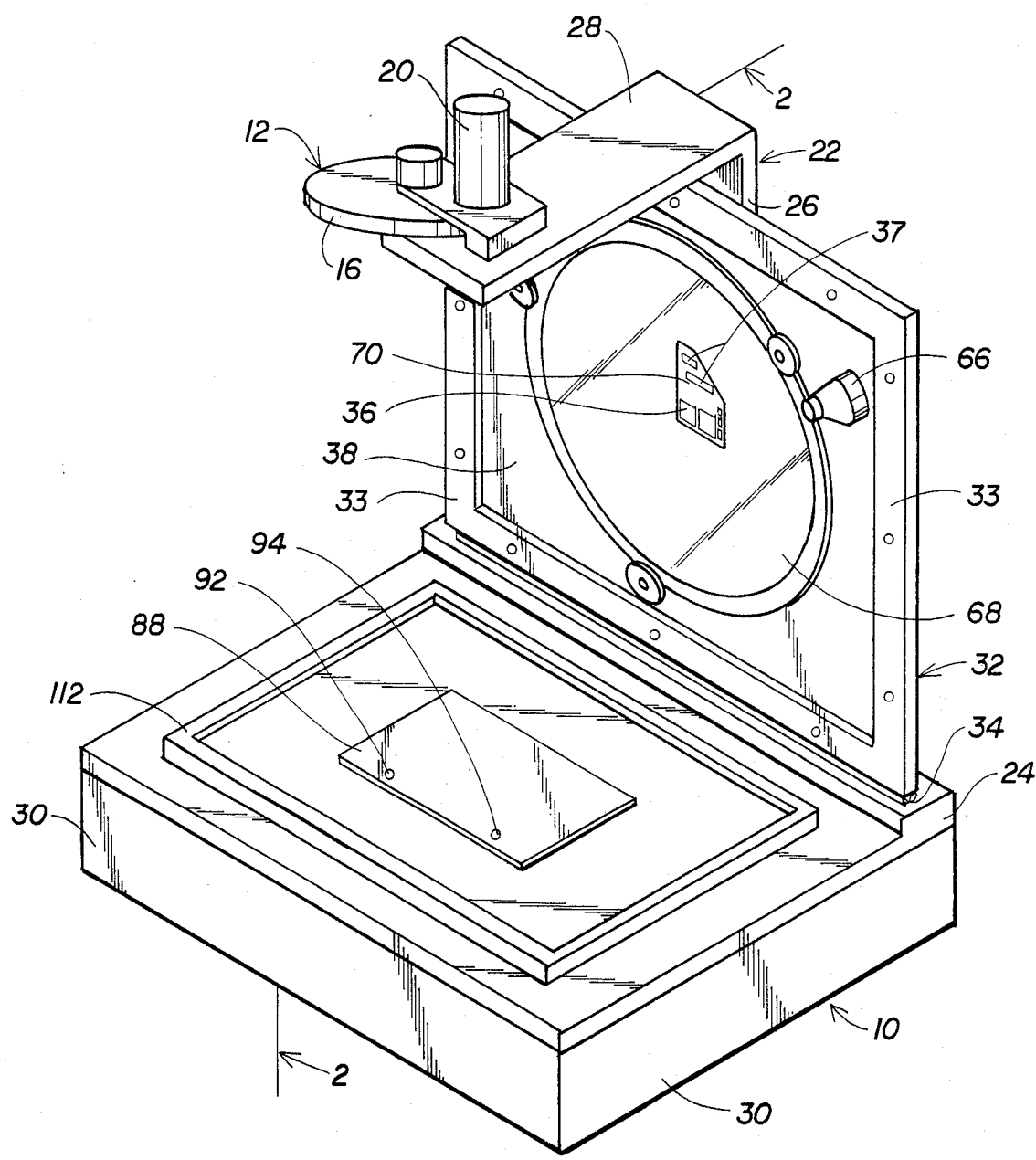
FIG. 1 is a perspective view of one embodiment of the apparatus of this invention.
Figure 2:
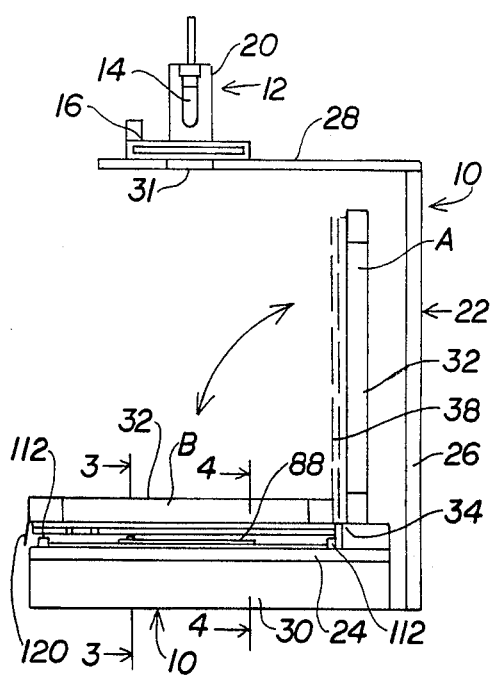
FIG. 2 is a sectional view of the apparatus of FIG. 1 taken along lines 2—2 in FIG. 1.

Referring to FIGS. 1 and 2, apparatus 10 is provided for exposing color correction masks and color separation negatives through color transparencies. The apparatus 10 is particularly adapted for use with Kodak Pan Masking Film, which is specially designed for making color correction masks, and Kodak Separation Negative Type II Film, which is specially designed for making separation negatives, although the use of other suitable films is contemplated.

These films, and most other similar films, respond differently to different colors of light through substantial portions of their characteristic curves. For example, an image exposed to light through a red filter and developed under given conditions has a certain level of contrast. That same image exposed to green light and developed under the same conditions may have somewhat more contrast, and the same image exposed to blue light may have considerably less contrast when developed under those conditions.

Data published by Kodak regarding its Pan Masking Film, which is incorporated herein by reference, indicates that under certain circumstances the development time of all of the correction masks in a set of four-color masks is the same. Specifically, the data suggests a development time of 3.25 minutes using Kodak DK-50 Developer, diluted one part developer to one part water (1:1), with continuous agitation in a tray at 68° F. (20° C.). That data also recommends changing the development times, which is the common practice, to obtain desired contrast levels, or contrast indices, in the masks.

Separation negatives for color transparencies are often made on film such as Kodak Separation Negative Type I Film. Kodak Type I Film yields adequate contrast indices for transparencies, but at least some of the negatives usually must be developed for different times. For example, to obtain a contrast index of 0.8, the negatives made through the green and red filters should be developed for about 6.5 minutes in Kodak DK-50 Developer (1:2), and the negative made through the blue filter should be developed for about 8 minutes. Data regarding the exposure and development of Kodak Separation Negative Type I Film is incorporated herein by reference.

Kodak Separation Negative Type II FIlm is often used for reflective copy applications, where relatively high film contrast indices are needed. Data published by Kodak regarding that film, which is incorporated herein by reference, indicates that in order to obtain balanced contrast of all colors in reflective copy applications, the negatives should be developed for different times. For example, the data indicate that to obtain a contrast index of 1.5, a green filter negative should be developed in Kodak DK-50 Developer (1:2) for about 10 minutes with continuous agitation at 68° F. (20° C.), a red filter negative should be developed for about 11 minutes, and a blue filter negative should be developed for about 12 minutes under those conditions.

Extrapolation of the data for Kodak Separation Negative Type II Film, and experimentation, indicate that when the development time is reduced, the response of Type II film to red, green and blue light coincide, or nearly coincide. For example, all three negatives will have a contrast index between about 0.8 and 1.0 when developed for between about 4 and 5 minutes with continuous agitation in Kodak DK-50 Developer (1:2) at 68° F. (20° C.). Such contrast indices are adequate and are often preferred for color transparency applications. Thus, it has been found that by reducing the development time, and consequently the over-all contrast index, of a relatively high contrast index film such as Kodak Separation Negative Type II Film, the response of the film to red, green and blue light is substantially identical when properly exposed and properly developed under identical conditions.

If the contrast index of all of the separation negatives is fixed at a single value, and the contrast index of all of the correction masks is also a single value, the mid-tones of the resulting print are likely to be out of balance, and might have a brown tint. While under current practice the development times of the separation negatives or the color correction masks might be changed to balance the mid-tones, the mid-tones may also be balanced by increasing the exposure time of at least one of the masks substantially. For example, increasing the exposure time of the cyan mask in four color processing is particularly helpful when seeking mid-tone balance.

The technique of increasing exposure time to balance the mid-tone or highlight regions of an image is known as shouldering. It has now been learned that by increasing the exposure time of at least one of the masks dramatically, the mid-tones may be suitably balanced without changing the development times of the color correction masks or the separation negatives. Thus, control of the process is placed to a greater extent in the exposure of the color correction masks.

A prophetic example of possible exposure and development times for the color correction masks and separation negatives may be helpful to fully understand the process just described. Using Kodak Pan Masking Film, desired contrast indices might be achieved using a development time of about 2.5 minutes in Kodak DK-50 Developer (1:2) at 68° F. (20° C.) with continuous agitation. The cyan printer mask (CM) might be exposed using a Kodak 85B filter and a neutral density filter of 1.20. The magenta printer mask (MM) may be exposed using a Kodak 33 filter and a neutral density filter of 0.90, the yellow printer mask (YM) may be exposed using a Kodak 58 filter and a neutral density filter of 0.30, and the black printer mask (KM) may also be exposed using a Kodak 58 filter and a neutral density filter of 0.30. If the masks are exposed for about 10 seconds, the resulting densities may be about those shown in Table 1 for the highlight (H), mid-tone (M) and shadow (S) regions of the transparency, as defined by the standard gray scale values (GS) shown therein.

Using those developed masks and Kodak Separation Negative Type II Film, the separation negatives could be developed for about 2.5 minutes using Kodak DK-50 Developer (1:2) at 68° F. (20° C.) with continuous agitation. The cyan printer negative might be exposed using a Kodak 25 filter and a 0.90 neutral density filter, and the magenta printer negative might be exposed with a Kodak 58 filter and a 0.60 neutral density filter. The yellow printer negative might be exposed using a Kodak 47 filter and a 0.30 neutral density filter, and the black printer negative could be exposed with a Kodak 85B filter and a 1.00 netural density filter.

The exposure times of all of the separation negatives could be about 10 seconds. The resulting densities of the cyan printer negative (CN), magenta printer negative (MN), yellow printer negative (YN) and the black printer negative (KN) would then be about those shown in Table 1 for the highlight, mid-tone and shadow regions of the transparency.

TABLE 1

| | Mask and Separation Negative Densities | | | | | | | |
|---|---|---|---|---|---|---|---|---|
| GS | CM | MM | YM | KM | CN | MN | YN | KN |
| 0.30 (H) | 1.20 | 1.15 | 1.15 | 1.15 | 1.70 | 1.70 | 1.70 | 1.70 |
| 1.20 (M) | 1.00 | 0.75 | 0.75 | 0.75 | 0.80 | 1.00 | 1.00 | 1.30 |
| 2.40 (S) | 0.55 | 0.30 | 0.30 | 0.30 | 0.20 | 0.40 | 0.40 | 0.50 |

These numbers are estimates for use in offset lithography, and actual times and conditions would vary depending upon many factors, including aesthetic desires. Such variations, and the manner of making them, will be apparent to those skilled in the art.

The apparatus 10 (FIGS. 1 and 2) includes a light source 12 for providing filtered light of selected wavelengths so that only preselected colors of light are emitted. The light source 12 has a bulb 14 which emits white light, a filter means 16 which absorbs substantially all light of undesired colors, and a housing 20 which prevents the emission of excessive white light.

The light source 12 may be supported by any suitable means, such as a frame 22. Frame 22 in FIGS. 1 and 2 includes a substantially horizontal base 24, a substantially vertical back member 26, and a light supporting member 28. The base 24 is preferably elevated somewhat by legs 30, for reasons which will become apparent. Filtered light from the light source 12 passes through an orifice 31 in the member 28.

Filter means 16 may be a series of individual filters, or a single wheel having a plurality of filters (not shown) which may be selectively placed over the orifice 31 by rotating the wheel. While the filters could be changed manually, it is preferable to control them automatically, as will be seen.

A slide holder 32 may be secured to the frame 22 by any suitable means, such as a piano hinge 34. The slide holder 32 may be raised to position A in FIGS. 1 and 2 so that at least one color slide transparency 36 (FIG. 1) may be secured to or removed from the slide holder 32, or lowered to position B in FIG. 2 so that the slide 36 is supported a predetermined distance from the light source 12. Gray scales 37 (FIG. 1), color bars or the like may be taped or otherwise secured to the slide holder 32, if desired.

The slide holder 32 includes a clear plate assembly 38 (FIG. 1), which may be supported around the edges by pieces of wood 33 or the like. The assembly 38 (FIGS. 3 and 4) includes a top layer 40 which extends across the entire assembly 38, a fixed outer lower layer 42 which is secured to the upper layer 40, a fixed inner circular layer 44 secured to the top layer 40, and a ring 46 rotatably secured between the outer layer 42 and the inner layer 44. The inner layer 44 includes registration openings 47, 48.

The ring 46 is held near the top layer 40 by a plurality of retainers 54, 56 (FIGS. 5, 6 and 7) which are secured to layer 40 by any suitable means such as bolts 58, 60. The retainers 54, 56 are spaced from the layer 40 so that the bottom of the ring 46 rests at least about 1/16 inch below the bottom of the inner layer 44.

Figure 5:
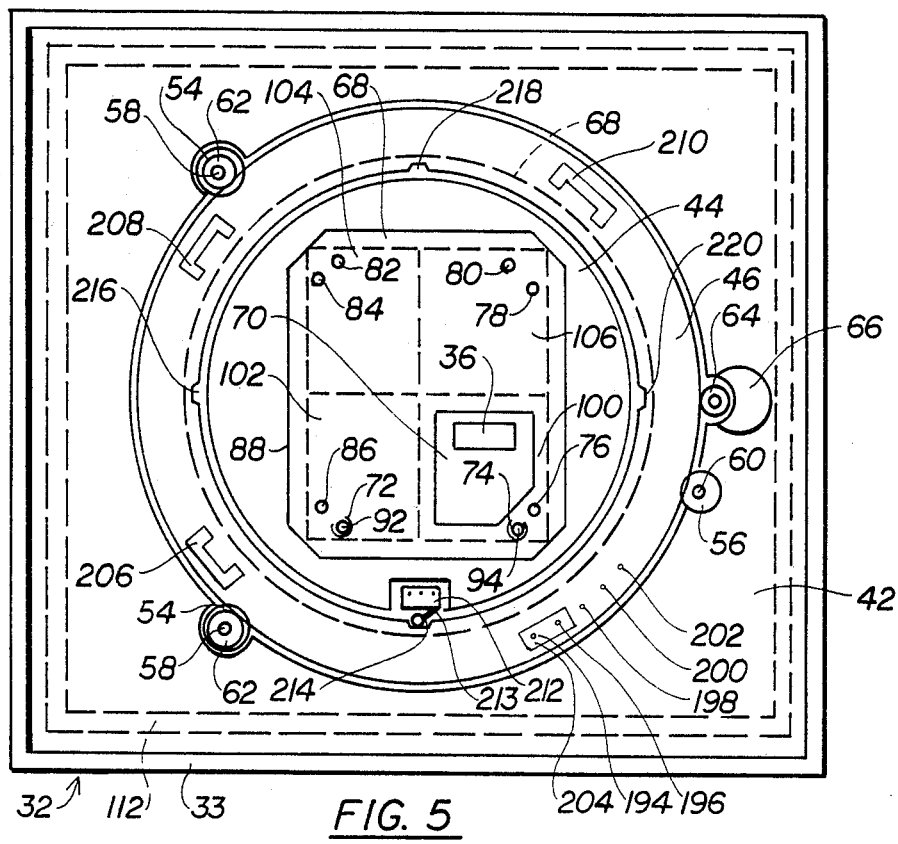
FIG. 5 is a plan view of a portion of a holder for color transparencies which is included in the apparatus shown in FIGS. 1 and 2.

The ring 46 is maintained in spaced relation to the outer layer 42 and inner layer 44 by a plurality of bearing surfaces 62, and a motor drive wheel 64 (FIG. 5). The bearings 62 may also be secured to the layer 40 by the bolts 58. The drive wheel 64 is operatively connected to a motor 66, which is secured to the outer layer 42 and upper layer 40 by any suitable means. The motor 66 rotates the ring 46 by means of the drive wheel 64.

The retainer 56 (FIG. 7) holds the ring 46 near layer 40, but does not provide a bearing surface for maintaining the desired relation between the layers 42, 44. While several bearing surfaces could be provided for maintaining the spaced relation, it has been found that providing three bearing surfaces is preferable because it permits greater parts tolerances, particularly in the ring 46. With three bearing surfaces, the ring 46 may rotate properly, maintaining an adequate spaced relation to the layers 42, 44, even with some imperfections in its roundness.

An opaque shield 68 (FIG. 1) is secured by tape or other suitable means across the ring 46 beneath layer 44 for rotation with the ring 46. The shield 68 includes holes 72, 74, 76, 78, 80, 82, 84, 86 (FIG. 5) which are arranged so that two of the holes are aligned with alignment openings 47, 48 in layer 44 whenever the ring 46 is in a proper position for film exposure.

A translucent plastic sheet 70 (FIGS. 1, 3 and 5) is secured across an opening in the shield 68. The sheet 70 is preferably frosted plastic such as DuPont UC-4 plastic or the like, which reduces or eliminates Newton's rings, and is secured to the shield 68 by tape or any suitable means. The slide 36 is preferably secured to the exposed underside of the sheet 70.

A film plate 88 (FIGS. 3 and 4) is secured to a flexible mat 90, and the outer edges of the flexible mat 90 are secured to the base 24. The film plate 88 includes registration pins 92, 94, for purposes of alignment in registration openings 47, 48, and preferably includes a covering of velvet or other material capable of absorbing parts tolerances and thickness variations caused by the film, gray scales, mounting tapes and the like.

A piece of color correction masking film 96 or separation negative film 98 (FIG. 5) may be placed on the rigid film plate 88. The films 96, 98 are preferably each a single sheet of film which may be figuratively divided into four quadrants 100, 102, 104 and 106 for purposes of discussion and understanding. Registration holes 108, 110 are provided in the films 96, 98 through which the registration pins 92, 94 fit snugly for proper alignment of the film 96 or 98 on the film plate 88.

When placed in position B (FIG. 2), the ring 46 may be rotated so that the slide 36 is over each of the successive quadrants 100, 102, 104 and 106 for exposure of each quadrant to properly filtered light. The opaque shield 68 prevents the three unselected quadrants from being exposed. The films 96, 98 may be any suitable size, and need not cover the entire shield 68, provided that there is enough film in each quadrant 100, 102, 104 and 106 to make an exposure of the entire slide 36 in each quadrant.

A gasket 112 (FIGS. 3 and 4) is provided around the film plate 88 and at least a portion of the mat 90 so that a substantially airtight sealed chamber 114 (FIGS. 3 and 4) may be created when the slide holder 32 is placed in position B in FIG. 2. A vacuum hose 116 (FIGS. 3 and 4) is secured to the mat 90 so that the chamber 114 can be evacuated by a vacuum pump 118 at appropriate times. When the chamber 114 is evacuated, the film plate 88 is drawn upwards until the film 96 or 98 is in contact with the slide 36 and the shield 68.

The remaining structure of the apparatus 10 may now be described in conjunction with a discussion of its operation. Generally, the color correction masks are made first. The slide 36 is secured to the sheet 70 (FIG. 1), and the color correction masking film 96 is placed on the film plate 88. The registration holes 108, 110 (FIGS. 8A and 8B) in the film 96 secure the film 96 in fixed relation to registration pins 92, 94 on the film plate 88. Registration holes may be punched in the separation negative film when they are punched in the mask film, to insure proper registration of the two films later in the process.

The slide holder 32 is lowered to position B in FIG. 2 and secured by a hook 120 or any other suitable means. A proper filter in filter means 16 is located over the orifice 31, and the ring 46 is rotated so that the slide 36 is over the first quadrant 100 of the film 96.

The vacuum pump 118 (FIGS. 3 and 4) may then be turned on. When a sufficient vacuum is created in the chamber 114, the film plate 88 is drawn toward the sheet 70 until the film 96 directly contacts the slide 36, as seen in FIG. 4. The velvet or other covering on the film plate 88 provides even contact despite any irregularities in the film plate 88 or the inner layer 44. In this manner, the first quadrant 100 of the film 96 is maintained a predetermined distance from the slide 36 for exposure of that quadrant of the film to filtered light from the light source 12.

In the embodiment shown in FIGS. 3 and 4, the film 96 is in direct contact with the slide 36. Registration pins 92, 94 fit through holes 72, 74 (FIG. 5) into registration openings 47, 48 to properly fix the spacial relationship of the slide 36 and the film 96, and the opaque shield 68 prevents the other quadrants 102, 104 and 106 of the film 96 from being exposed to the filtered light when the first quadrant 100 is exposed.

After the first quadrant 100 of the film 96 is exposed, and the light source 12 has been turned off, the vacuum created by the pump 118 may be released. A plurality of spring assemblies 122, 124 (FIGS. 3 and 4) are secured to both the film plate 88 and the base 24 to more rapidly return the film plate 88 to the base 24, and an orifice 126 permits air to flow freely between the base 24 and the mat 90. The legs 30 on the base 24 provide the space needed for the spring assemblies 122, 124 and the vacuum hose 116.

When the registration pins 92, 94 disengage, the ring 46 may be rotated until the slide 36 is located over the second quadrant 102 of the film 96. When the vacuum pump 118 is turned on again and the film plate 88 and film 96 are drawn up to the slide 36, the second quadrant 102 of the film 96 and the slide 36 are in contact with each other and register pins 92, 94 pass through holes 84, 86. When the filter is changed, the second quadrant 102 of the film 96 may be exposed. The shield 68 then prevents the remaining quadrants 100, 104 and 106 of the film 96 from being exposed. After the second quadrant 102 of the film 96 is exposed, quadrants 104 and 106 may be exposed in a similar manner. When the fourth quadrant 106 is exposed, the film 96 may be removed and developed.

Figure 8A:
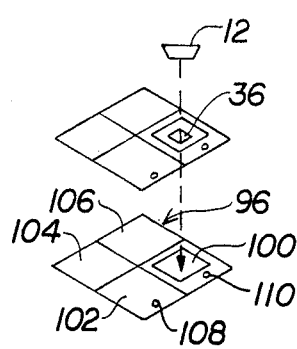
FIGS. 8A and 8B are diagrams showing the manner in which color correction film and separation negative film are exposed to light.
Figure 8B:
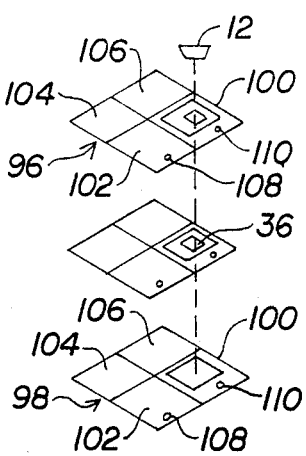

The set of separation negatives is made after the color correction masks are developed because the masks are used to make the negatives. When properly filtered light is exposed to the negatives, the light must pass first through an appropriate mask, through the slide transparency, and then onto the separation negative film. This is shown in FIGS. 8A and 8B. In FIG. 8A, light passes from light source 12, through the slide 36 onto the undeveloped color correction mask film 96. In FIG. 8B, light from the light source 12 first passes through the developed film 96, then through the slide 36 onto the exposed quadrant of undeveloped separation negative film 98.

In the apparatus 10, the film configuration for the separation negatives is accomplished by partially removing the shield 68, without removing it entirely, registering the masking film 96 with removable pins (not shown) which fit in the inner layer 44, and securing the color correction masking film 96 to the inner layer 44 with double-sided adhesive tape or the like. The removable pins may be removed when the masking film 96 is secured, and the shield 68 may be resecured to the ring 46. Since the shield 68 is at least about 1/16 inch below the bottom of layer 44, the ring 46 may easily rotate, even with the mask film 96 in place.

The exposure of the separation negative film 98 is otherwise similar to the exposure of the masks, except that the development times and light filters are usually different.

Figure 9:
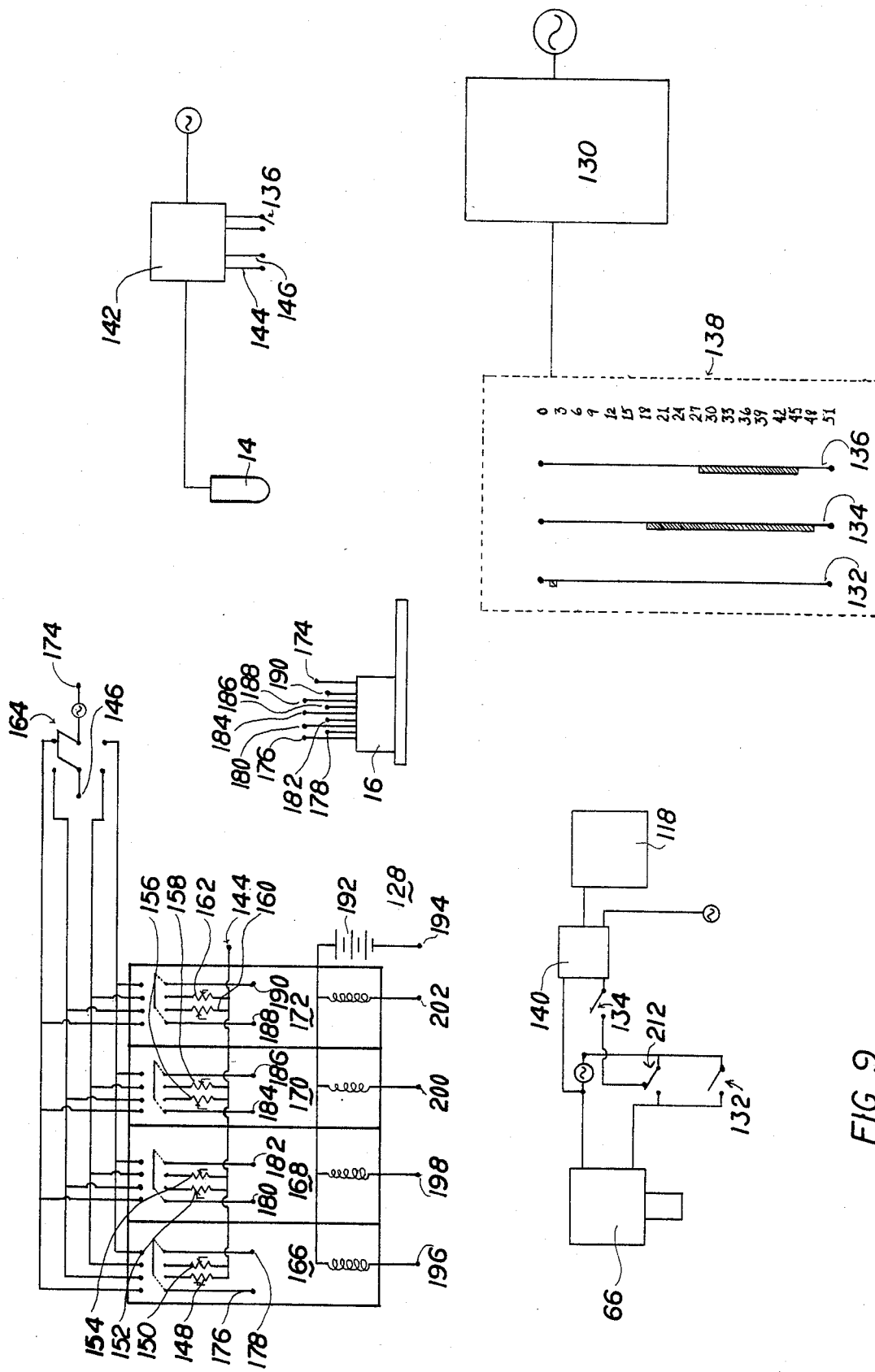
FIG. 9 is a schematic diagram of control means for the apparatus of FIG. 1.

While the bulb 14, light filter 16, pump 118 and ring 46 may be operated manually to expose the four quadrants of the films 96, 98, it is preferable to control the entire process automatically, with the use of electromechanical devices, or electronic controls. A control system suited for this purpose is shown in FIG. 9.

The control system 128 generally includes a system timer 130 which has three sets of normally open contacts 132, 134, 136. The contacts may be closed at preselected times for predetermined time intervals, such as those shown in the diagram designated 138. The contacts 132 are used in the operation of the motor 66, and the contacts 134 are connected to a relay 140, which controls the operation of the vacuum pump 118.

The contacts 136 are connected to an exposure timer 142, which determines the length of time the bulb 14 is turned on.

While the exposure timer 142 may only turn on the bulb 14 when the contacts 136 are closed, the length of time that the bulb 14 remains on, which is the exposure time, is a function of a resistance connected across terminals 144, 146 on the timer 142. A plurality of potentiometers 148, 150, 152, 154, 156, 158, 160 and 162 are provided so that the exposure time for each of four color correction masks and each of four separation negatives may be individually preset before any exposures are made.

A switch 164 is provided for selecting a set of the potentiometers 148, 152, 156 and 160 for exposure of the masks, or a set of the potentiometers 150, 154, 158 and 162 for exposure of the separation negatives. An individual potentiometer is selected to determine the exposure time for each exposure by energizing the coil in a relay 166, 168, 170 or 172.

Filter means 16 includes a filter wheel (not shown) which has a plurality of filters. A desired filter may be selected by connecting a common contact 174 to a contact 176, 178, 180, 182, 184, 186, 188 or 190 through a power source.

The proper filter in filter means 16 is selected by setting the switch 164 for selection of the correction mask filters or the separation negative filters, and energizing the coil in the appropriate relay 166, 168, 170 or 172. One of the coils in relay 166, 168, 170 or 172 is energized through a power source 192 when a common contact 194 is connected to a contact 196, 198, 200 or 202.

The contacts 194, 196, 198, 200 and 202 are located in the top layer 40 (FIG. 5). The contacts 196, 198, 200 and 202 are selected for connection to contact 194 by conductors 204, 206, 208 and 210, respectively. The conductors 204, 206, 208, and 210 may be foil or any suitable material, and are secured to the top of ring 46 (FIG. 6).

A microswitch 212 having a blade 213 is secured to the upper layer 40 (FIG. 5), and is electrically connected to the circuits for the motor 66 and the vacuum pump relay 140 (FIG. 9). As the ring 44 rotates, the blade 213 moves in and out of a series of notches 214, 216, 218, and 220 in the ring 44 (FIG. 5). The contacts of the switch 212 are connected as shown in FIG. 9 when the switch 212 is in one of the notches.

The system timer 130 may have any suitable cycle, such as a 204 second cycle which includes four 51 second sub-cycles, one of which is shown at 138 in FIG. 9. FIG. 5 shows the orientation of the ring 46 at the end of the first sub-cycle. At 0 seconds of the first sub-cycle, contacts 132, 134 and 136 are open, and the contacts of microswitch 212 are as shown in FIG. 9. At about 2 seconds, contacts 132 close, starting the motor 66. When the motor 66 rotates the ring 46, the blade 213 of the microswitch 212 leaves the notch 220, changing the contacts of the microswitch 212. At about 3 seconds, contacts 132 are opened, but the selected contacts of the microswitch 212 keep the motor 66 running until the blade 213 enters the next notch 214, returning the contacts to the configuration shown in FIG. 9. The microswitch 212 disables the motor 66 and the ring 46 stops. This occurs at about 17 seconds.

At about 18 seconds, contacts 134 close and relay 140 is energized through the normally closed contacts of the microswitch 212. The microswitch 212 disables the vacuum pump relay 140 when the blade 213 is not in a notch. The relay 140 immediately starts the vacuum motor 118, creating a vacuum in the chamber 114 and drawing the film plate 88 towards the shield 68.

When the film plate 88 engages the shield 68, the ring 46 is pressed against the upper layer 40, and the contact 194 is connected to contact 196 by the conductor 204. The coil in relay 166 is activated, and if the switch 164 is connected as indicated in FIG. 9, the potentiometer 148 is selected for contacts 144, 146 of timer 142. The resistance of potentiometer 148 determines the exposure time.

When the coil of the relay 166 is activated, power is applied to contacts 174 and 176, which are connected to the filter wheel in filter means 16, and the wheel rotates until the proper filter is located beneath the bulb 14. The wheel has internal circuitry which causes it to stop at the appropriate point.

By about 25 seconds, the registration pins 92, 94 have properly aligned the film 96 with the slide 36, and the film plate 88 has pressed the film 96 into firm contact with the slide 36. At about 27 seconds, contacts 136 are closed and the bulb 14 is turned on. Contacts 136 remain closed until about 45 seconds, although the timer 142 will cause the bulb 14 to turn off after a time determined by potentiometer 148.

At about 48 seconds, contacts 134 open, and vacuum pump 118 turns off. The film plate 88 lowers and the register pins 92, 94 disengage. The sub-cycle ends at about 51 seconds.

The second, third and fourth sub-cycles may begin immediately in sequence. The appropriate contacts are connected during each sub-cycle so that the desired filters and exposure times are obtained for each sub-cycle.

At the end of the 204-second cycle, the masking film 96 may be removed and developed. The cycle for the exposure of the separation negatives is much the same as that just described, except that the switch 164 is turned so that potentiometers 150, 154, 158 and 162 are selected during the four sub-cycles.

The many advantages of this invention are now apparent. A set of color correction masks or a set of separation negatives may each be exposed on a single piece of film, so that the film is used more efficiently. Since a single piece of film is used for each set, all of the masks or all of the separation negatives may be developed simultaneously under the same conditions. Also, the entire exposure process may be automated so that all of the masks or all of the negatives may be exposed sequentially, without adjustments or interruptions.

While in the foregoing specification this invention has been described in relation to certain preferred embodiments, thereof, and many details have been set forth for purposes of illustration and understanding, it will be apparent to those skilled in the art that the invention is susceptible to additional embodiments and that certain of the details described herein may be varied considerably without departing from the basic principles of the invention. For example, it is contemplated that the entire system could be controlled electronically, perhaps with microcomputer control. Also, while the system described is well suited for four-color processing, it could also be adapted for use with processes using more or less than four colors. The opaque shield which covers three quadrants of the film need not be moved in a circular manner, and could be moved linearly instead, or the film could be moved in a circle or in a line instead of the shield.

What is claimed:

1. A method of producing a set of color separation negatives from a color transparency under identical negative development conditions, each of said negatives having a desired contrast index, comprising the steps of
   obtaining from separation negative film data a single set of negative development conditions which will substantially provide said desired contrast index for each of said negatives;
   obtaining from separation negative film data a negative exposure time for each of said negatives so that the contrast index of each of said negatives will be substantially as desired when said negatives are developed;
   obtaining from mask film data a single set of mask development conditions for a set of color correction masks to be used when exposing said set of separation negatives;
   obtaining from mask film data a mask exposure time for each of said masks so that when said masks are exposed for said mask exposure times and developed under said mask development conditions, and said negatives are exposed for said negative exposure times and developed under said negative development conditions, said negatives have said desired contrast indices;
   sequentially placing each of a plurality of segments of at least one piece of color correction mask film in contact with said transparency and exposing each of said mask film segments to properly filtered light for said predetermined mask exposure times, said filtered light being provided by a light source which is a predetermined distance from said transparency and said mask film segments;
   developing all of said mask film segments under said single development conditions to produce said set of color correction masks;
   prepositioning each of a plurality of segments of at least one piece of separation negative film for contact with said transparency, prepositioning said color correction masks for contact with and proper registration with said transparency on the side of said transparency opposite said segments of separation negative film, sequentially placing said transparency in contact with and in proper registration with each of said selected color correction masks and sequentially exposing said negative film segments to properly filtered light passed through each of said selected masks and through said transparency for said predetermined negative exposure times when each said selected mask is in contact with said transparency, said filtered light being provided by said light source; and
   developing all of said negative film segments under said negative development conditions to produce said set of separation negatives.

2. The method of claim 1 wherein at least two of said negatives are developed simultaneously.

3. The method of claim 1 wherein said set of negatives is contained on a single piece of separation negative film.

4. The method of claim 1 wherein said set of negatives comprises four negatives.

5. The method of claim 1 comprising the steps of presetting said negative exposure time for each of said negatives; and exposing each of said negatives in sequence automatically.

6. The method of claim 1 wherein at least two of said masks are developed simultaneously.

7. The method of claim 1 wherein said set of masks is contained on a single piece of masking film.

8. The method of claim 1 wherein at least two of said masks are contained on a single piece of masking film.

9. The method of claim 1 wherein said set of masks comprises four masks.

10. The method of claim 1 comprising the steps of
presetting said mask exposure time for each of said masks; and
exposing each of said masks in sequence automatically.

11. Apparatus for exposing a set of continuous tone color correction masks on a single piece of masking film having a plurality of portions comprising
light source means for providing filtered light of preselected wavelengths so that substantially only preselected colors of light are emitted by said light source means;
means for supporting at least one color transparency a predetermined distance from said light source means;
means for maintaining a first portion of said film in contact with said transparency for exposure of said first portion to said filtered light through said transparency;
means for exposing only said first portion of said film to said filtered light for a predetermined exposure time, while preventing the remaining portions of said film from being exposed to said filtered light while said first portion is exposed;
means for successively locating said transparency in contact with each of said remaining portions of said film for successive exposure of each of said remaining portions to said filtered light through said transparency;
means associated with said light source means for successively changing said selected wavelengths and selected colors of said filtered light for exposure of said remaining portions to different selected colors of filtered light; and
means for successively exposing each of said remaining portions of said film to said filtered light for a predetermined exposure time while preventing the undesired exposure of other portions of said film.

12. The apparatus of claim 11 wherein said light source means comprises
an electric light bulb which emits substantially white light;
filter means in optical communication with said bulb for passing substantially all light of said preselected wavelengths, and absorbing substantially all other light; and
housing means in optical communication with said bulb for preventing the emission of undesired white light.

13. The apparatus of claim 12 wherein said means for changing said selected wavelengths of said filtered light comprises a filter wheel in said filter means having a plurality of filters which may be selected by rotating said wheel.

14. The apparatus of claim 11 wherein said transparency supporting means comprises a slide holder to which said transparency may be removably secured, and a frame to which said slide holder is movably secured, said light source means also being secured to said frame so that said frame maintains said predetermined distance between said transparency and said light source means.

15. The apparatus of claim 14 wherein said means for maintaining a first portion of said film a predetermined distance from said transparency for exposure of said first portion to said filtered light through said transparency comprises
a flexible mat movably secured to said frame adjacent said slide holder opposite said light source means;
sealing means around an outer periphery of said mat and said slide holder for creating a vacuum chamber between said mat and said slide holder when said slide holder is said predetermined distance from said light source;
a film plate secured to said mat in said chamber for holding said film; and
vacuum pump means for creating a vacuum in said vacuum chamber and drawing at least said first portion of said film on said film plate into contact with said slide holder.

16. The apparatus of claim 14 wherein said means for exposing only said first portion of said film to said filtered light for a predetermined time, while preventing the remaining portions of said film from being exposed to said filtered light while said first portion is exposed comprises
a timer electrically connected to said light source means which may be preset to turn said light source on for said predetermined exposure time; and
an opaque shield secured to said slide holder to prevent the remaining portions of said film from being exposed to said filtered light while said first portion is exposed.

17. The apparatus of claim 16 wherein said means for successively locating said transparency a predetermined distance from each of said remaining portions of said film for successive exposure of each of said remaining portions to said filtered light through said transparency comprises
a rotatable ring in said slide holder; and
a translucent sheet secured across said ring for rotation therewith, said transparency being secured to said sheet so that when said ring rotates, said transparency may be successively moved adjacent each of said portions of said film.

18. The apparatus of claim 17 wherein said means for successively exposing each of said remaining portions of said film to said filtered light for a predetermined time while preventing the exposure of the other portions of said film comprises
a plurality of timer adjusting means for presetting said timer for a desired exposure time for each of said portions;
a motor for rotating said ring a predetermined number of degrees between exposures of said portions; and
control means for enabling and disabling said motor, said timer, said timer adjusting means, said light source means and said vacuum pump at predetermined times so that each said portion is properly exposed to properly filtered light for proper exposure times.

19. Apparatus for exposing a set of color separation negatives on a single piece of separation negative film having a plurality of portions comprising light source means for providing filtered light of preselected wavelengths so that substantially only preselected colors of light are emitted by said light source means;

means for supporting at least one color transparency a predetermined distance from said light source means;

means for prepositioning a set of color correction masks in a predetermined relationship to said transparency;

means for supporting a selected one of said set of color correction masks between said transparency and said light source means, said mask being in contact with and in proper registration with said transparency;

means for maintaining a first portion of said film in contact with said transparency for exposure of said first portion of said filtered light through said transparency and said selected color correction mask;

means for exposing only said first portion of said film to said filtered light for a predetermined time, while preventing the remaining portions of said film from being exposed to said filtered light while said first portion is exposed;

means for successively locating said transparency in contact with and in proper registration with each of said remaining color correction masks in said set of masks, and maintaining each of said remaining masks in contact with one of said remaining portions of said film for successive exposure of each of said remaining portions to said filtered light through said transparency;

means associated with said light source means for successively changing said selected wavelengths and selected colors of said filtered light for exposure of said remaining portions to different selected colors of filtered light; and means for successively exposing each of said remaining portions of said film to said properly filtered light for a predetermined time while preventing the exposure of the other portions of said film.

20. The apparatus of claim 19 wherein said light source means comprises
an electric light bulb which emits substantially white light;
filter means in optical communication with said bulb for passing substantially all light of said preselected wavelengths, and absorbing substantially all other light; and
housing means in optical communication with said bulb for preventing the emission of undesired white light.

21. The apparatus of claim 20 wherein said means for changing said selected wavelengths of said filtered light comprises a filter wheel having a plurality of filters which may be selected by rotating said wheel.

22. The apparatus of claim 19 wherein said transparency supporting means comprises a slide holder to which said transparency may be removably secured, and a frame to which said slide holder is movably secured, said light source means also being secured to said frame.

23. The apparatus of claim 22 wherein said means for maintaining a first portion of said film a predetermined distance from said transparency for exposure of said first portion to said filtered light through said transparency comprises
a flexible mat movably secured to said frame adjacent said slide holder opposite said light source means;
sealing means around an outer periphery of said mat and said slide holder for creating a vacuum chamber between said mat and said slide holder when said slide holder is said predetermined distance from said light source;
a film plate secured to said mat in said chamber for holding said film; and
vacuum pump means for creating a vacuum in said vacuum chamber and drawing at least said first portion of said film on said film plate into contact with said slide holder.

24. The apparatus of claim 22 wherein said means for exposing only said first portion of said film to said filtered light for a predetermined time, while preventing the remaining portions of said film from being exposed to said filtered light while said first portion is exposed comprises
a timer electrically connected to said light source means which may be preset to turn said light source on for said predetermined time; and
an opaque shield secured to said slide holder to prevent the remaining portions of said film from being exposed to said filtered light while said first portion is exposed.

25. The apparatus of claim 24 wherein said means for successively locating said transparency a predetermined distance from each of said remaining portions of said film for successive exposure of each of said remaining portions to said filtered light through said transparency comprises
a rotatable ring in said slide holder; and
a translucent sheet secured across said ring for rotation therewith, said transparency being secured to said sheet so that when said ring rotates, said transparency may be moved adjacent each of said portions of said film.

26. The apparatus of claim 25, wherein said means for successively exposing each of said remaining portions of said film to said filtered light for a predetermined time while preventing the exposure of the other portions of said film comprises
a plurality of timer adjusting means for presetting said timer for a desired exposure time for each of said portions;
a motor for rotating said ring a predetermined number of degrees between exposures of said portions; and
control means for enabling and disabling said motor, said times, said light source means and said vacuum pump at predetermined times so that each said portion is properly exposed to properly filtered light for proper exposure times.

27. The apparatus of claim 19 wherein said means for supporting said color correction masks comprises a fixed surface secured to said slide holder within said ring.

* * * * *